United States Patent [19]

Hayes et al.

[11] 4,370,233
[45] * Jan. 25, 1983

[54] CHEMICAL DETOXIFICATION OF SEWAGE SLUDGE

[75] Inventors: Thomas D. Hayes, Columbus, Ohio; Randolph M. Kabrick; William J. Jewell, both of Ithaca, N.Y.

[73] Assignee: Cornell Research Foundation, Inc., Ithaca, N.Y.

[*] Notice: The portion of the term of this patent subsequent to Jul. 7, 1998, has been disclaimed.

[21] Appl. No.: 281,950

[22] Filed: Jul. 10, 1981

[51] Int. Cl.³ .................. C02F 11/02; C02F 11/12
[52] U.S. Cl. ............................ 210/609; 210/613; 210/614; 210/901; 210/912; 210/919; 210/746
[58] Field of Search .............. 210/901, 912, 609, 612, 210/613, 614, 631, 620, 913, 919, 743, 746, 607; 423/99

[56] References Cited

U.S. PATENT DOCUMENTS

| | | | |
|---|---|---|---|
| 3,649,534 | 3/1972 | Schotte | 210/609 |
| 3,838,198 | 9/1974 | Bellamy et al. | 426/53 |
| 3,864,247 | 2/1975 | Fuchs | 210/613 |
| 3,892,660 | 7/1975 | Romell | 210/612 |
| 3,961,078 | 6/1976 | Stitt | 210/612 |
| 4,000,064 | 12/1976 | Romell et al. | 210/612 |
| 4,159,944 | 7/1979 | Erickson et al. | 210/609 |
| 4,277,342 | 7/1981 | Hayes et al. | 210/912 |

FOREIGN PATENT DOCUMENTS 2327965 5/1977 France .................. 210/609

Primary Examiner—Benoit Castel
Attorney, Agent, or Firm—Lois P. Besanko

[57] ABSTRACT

A method is disclosed for the chemical detoxification of anaerobically digested organic sludge containing toxic heavy metals in insoluble form. A quantity of the sludge is transferred from a conventional anaerobic digester to an insulated reactor vessel where the sludge is mixed and aerated at a rate sufficient to raise the oxidation reduction potential of the sludge to above +300 mv. and to maintain this condition for a period of 6–12 hours during which the heavy metals are converted to their desired oxidation state. The sludge is then acidified under controlled conditions to pH 1.0–3.0 for a period of 6–12 hours to solubilize the heavy metals. Conventional dewatering techniques are used to separate the detoxified, acidic sludge and the acidic, heavy-metal-containing water. The sludge may be neutralized for safe land application, and the metals can be recovered from the water using existing conventional techniques.

9 Claims, 5 Drawing Figures

CADMIUM SOLUBILIZATION IN SLUDGES ACIDIFIED TO A pH OF ≤ 1.5 WITH HCl

CHEMICAL DETOXIFICATION OF SEWAGE SLUDGE

The invention described herein was made in the course of work under a grant award No. R-804636-01 from the Environmental Protection Agency.

BACKGROUND OF THE INVENTION

Sludge disposal for many cities in the United States has become a problem of increasing dimensions in the last two decades. With the highest per capita sludge generation in the world, the U.S. now generates about 4.5 billion dry kg per year in sewage solids which must be disposed of or utilized in a manner posing the least amount of threat to the environment. At present, most of this sludge is disposed of by means of landfill, ocean dumping and incineration; relatively small amounts are applied to agricultural lands. In light of emerging environmental, energy and economic constraints, land application now appears to be one of the most viable sludge utilization and disposal alternatives for the future. However, present sludge management technology often cannot guarantee public health protection or cost effective solutions.

For years, the extraction of heavy metals from sewage sludges and sludge/soil mixtures with acid washings has been used as a standard laboratory test to determine the extent of metal uptake likely to occur with plants grown on sludge-amended soils. Laboratory tests have been conducted on untreated and anaerobically treated sludge using acid extraction techniques to remove heavy metals. These studies have shown that the direct acidification of primary, waste-activated, or anaerobically digested sludge cannot consistently achieve a rapid and quantitative solubilization of heavy metals. While the data reported in the prior art seem to indicate that a processing scheme consisting of acid treatment combined with dewatering may be capable of some degree of removal of heavy metals from municipal sewage sludge, previous systems do not disclose the efficient, low-cost method of heavy metals solubilization by oxidation-reduction potential adjustment and controlled-environment acidification.

The removal of heavy metals from municipal sewage sludge, however, has seldom been emphasized as a necessary treatment step. The presence of heavy metals, particularly cadmium, at significant levels in sludges of municipal treatment plants receiving industrial discharges has become a topic of increasing concern in the light of the potential impact of heavy metals on the environment and the food chain. Within the decade, evidence has been accumulated indicating that cadmium in sludge-amended soils can be magnified and accumulated in the food chain. Of further concern, cadmium has been reported to accumulate in the human kidneys to life-time levels not far below concentrations that would be expected to produce damage to this organ. Other toxic heavy metals known to be present in municipal sewage sludge include chromium, copper, lead, nickel and zinc. It is well established that heavy metals can be removed from dilute wastewaters passing through a municipal treatment plant with a high degree of efficiency. In typical municipal treatment plants accepting effluent discharges from industry, heavy metals in the treated sewage can be either adsorbed to organic particles and settled out in primary treatment or entrapped in the biological floc of the activated sludge process. Heavy metals can thus be removed from the sewage stream in primary and secondary treatment with combined efficiencies ranging from 60 to 90 percent in most cases. This results in a sludge with heavy metal concentrations 10 to 100 times greater than concentrations measured in the influent sewage. The metals in the resultant sludge are usually predominant in their insoluble form as precipitates of hydroxide, carbonate, phosphate or sulfide, especially when heavy metal concentrations exceed $10^{-4}$ M and when pH values at or above neutraliy are maintained. Sludges subject to prolonged thickening, storage, or anaerobic digestion, however, would have oxidation reduction potentials (ORP) in the range considered anaerobic, below $-330$ mv. Inorganic chemistry theory would predict that at low ORP and at near neutral pH, heavy metals such as cadmium, copper, nickel, iron, lead and zinc exist at equilibrium primarily as insoluble sulfide pricipitates.

The conversion of sludge heavy metals to the soluble form prior to physical separation would allow the removal of heavy metals with conventional dewatering techniques in use today (i.e., centrifugation, belt press, dewatering beds, vacuum filter, etc.).

The present invention represents an improvement over the combined biological-chemical detoxification methods of the Hayes et al U.S. Pat. No. 4,277,342 in the name of the same assignee as the present invention. In this prior Hayes et al patent, it was disclosed that the solubilization of heavy metals in a mixture of thickened primary sludge and secondary waste activated sludge could be achieved by first raising the oxidation reduction potential (ORP) of the sludge mixture followed by controlled acidification to pH 1.0–3.0 while maintaining the ORP above 0 mv. It was also reported that a biological reactor, called the "aerobic autoheated thermophilic digestion" (AATD) system, could be used to achieve both pasteurization of the sludge and the elevation of ORP required for rapid heavy metals solubilization. Results from bench scale experiments presented in that disclosure indicated that AATD treatment combined with "controlled environment acidification" to pH 1.0–3.0 could achieve nearly quantitative solubilization of heavy metals such as cadmium, zinc, and nickel, within 6.0 hours of acidification.

Although the initial performance data appeared promising, it was recognized that the biological processing stage, representing more than 85 percent of the total tank volume of the system, would comprise a substantial portion of the capital cost of a sludge metals extraction facility. It was also apparent that the biological/chemical detoxification invention was most applicable to integration into new or expanding sewage treatment facilities where the AATD system would not represent a redundant add-on process to existing municipal sludge stabilization systems, most of which employ anaerobic digestion. In addition, oxygen residuals that were necessary to maintain biological growth in aerobically digesting sludge were far higher than oxygen levels required to achieve ORPs favorable for metals solubilization. These considerations stressed the need for an improvement of the first invention which would eliminate the biological treatment system and thereby reduce tank volume and energy requirements for metals extraction.

SUMMARY OF THE INVENTION

A new method is disclosed herein which has the capability of conditioning anaerobic sludges for rapid metals solubilization without the use of an aerobic biological system. This method, called ORPA (oxidation reduction potential adjustment with acidification), essentially consists of adjusting the oxidation reduction potential (ORP) of the sludge to levels above +300 mv using short-term aeration, followed by acidification to a pH of 1.0–3.0 to achieve metals solubilization.

OBJECTS OF THE INVENTION

The primary object of the present invention is the production of detoxified organic residue from even industrially contaminated sludges that could be safely recycled back to agriculture at reasonably low capital and energy costs.

Another object of the invention is the solubilization of heavy metals in sewage sludge that has been pretreated in a system that produces a prolonged elevation of ORP (oxidation reduction potential).

Another object is to achieve prolonged elevations of ORP without the necessity of constructing and operating an aerobic sludge digestion system.

A still further object of the invention is the utilization of limited aeration for ORP control coupled with controlled-environment acidification and conventional dewatering methods as an effective, lowcost treatment method for the removal of cadmium and other heavy metals from municipal sewage sludge.

Yet another object of the invention is a method of chemically detoxifying anaerobically digested municipal or industrial organic sludge that can be effectively and inexpensively integrated into conventional anaerobic municipal sewage treatment systems.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
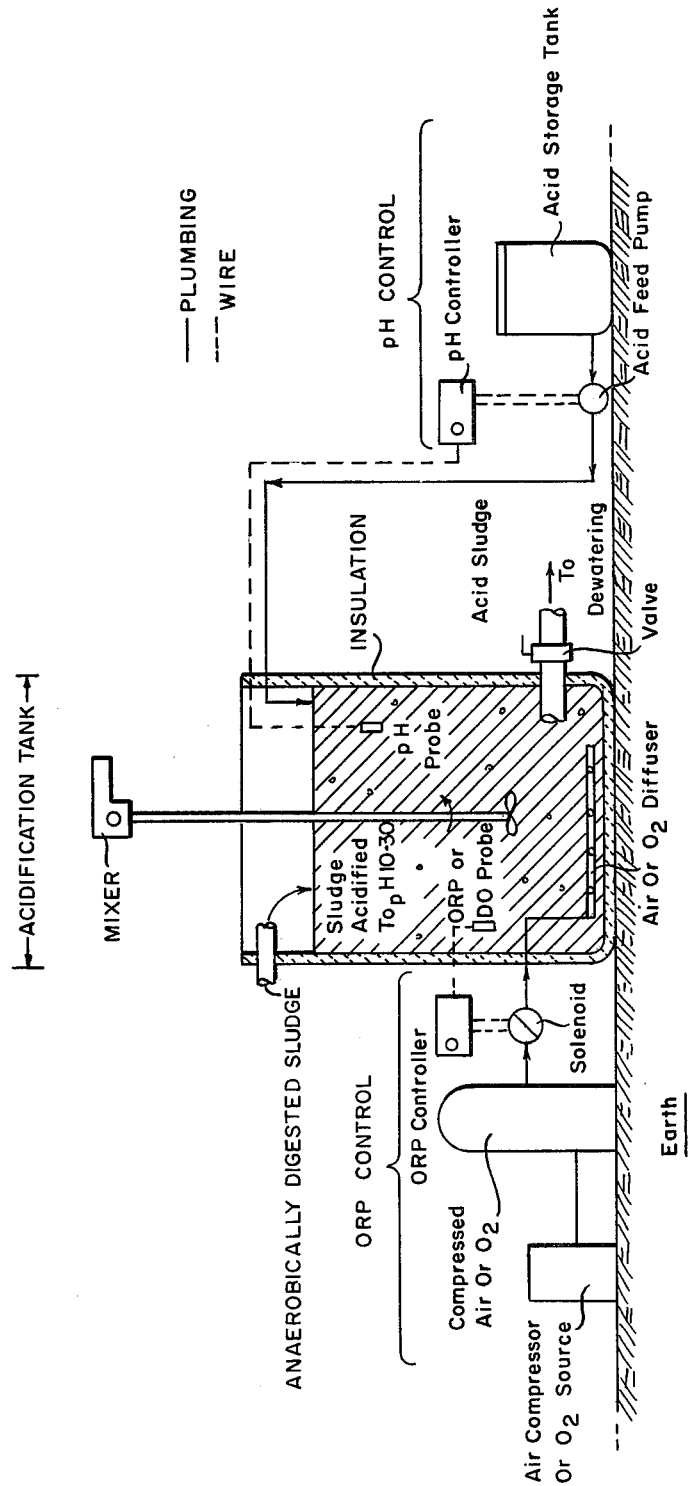
FIG. 1 illustrates diagrammatically the controlled environment acidification chamber of the present invention.

As shown in FIG. 1, suitable apparatus for practicing the method of the instant invention includes an acid-resistant tank or reaction vessel outfitted with an air or $O_2$ diffuser for aeration of the tank contents and a mechanical mixer. A pH control unit is interfaced with and acid-base feeding system and an ORP control unit is interfaced with the tank aerators. The reaction vessel is sized for a hydraulic retention time of 12 to 18 hours and is insulated to maintain the elevated temperature of anaerobically-digested sludge i.e. 30° C. to 60° C.

A quantity of an anaerobically digested sludge is transferred from an anaerobic digester to the reaction vessel, as further shown in FIG. 1. The sludge is mixed and aerated at a rate sufficient to raise the sludge oxidation reduction potential (ORP) to above +300 mv for a period of 6 to 12 hours. Immediately following this period of initial aeration, the sludge is acidified to a pH of 1.0 to 3.0 for a period of 6 to 12 hours by the addition of a concentrated acid such as sulfuric acid or hydrochloric acid while continuing to agitate the sludge and while maintaining aeration for ORP control above +300 mv. The acidified sludge is then subjected to conventional dewatering methods to produce dewatered, detoxified acidic sludge and acidic, heavy-metal-containing water. As a final step, the heavy metals may be recovered from the water by conventional methods, such as ion exchange, electrodeposition or selective precipitation. If desired, the acidic water may be recycled back to the acid feed system for the reactor vessel, or a buffer may be added to the water to neutralize it for recycling back into the primary settling tanks of the municipal system.

Important features of the ORPA reaction vessel include temperature maintenance and pH and ORP control. The temperatures of the anaerobically digested sludge are close to the temperatures of the anaerobic digesters which usually operate at 30°–35° C. or at 50°–60° C. Elevated temperatures of the sludge during the acidification process are maintained through the heat-conserving properties of the well-insulated tanks. Addition of acid to the sludge may be regulated by a pH control system consisting of a pH probe and a controller unit interfaced with an acid feeding system as shown in FIG. 1. The preferred pH value of the acidified sludge is 1.5 to 2.5. Other features of the acidification tank may include continuous or intermittent aeration regulated by an ORP control system, such as the Portatrol by Cole Parmer Company (Catalogue No. 5655–00), in order to maintain the ORP at levels conducive for the acid solubilization of sludge metals. Since parts per billion residuals of oxygen are required to raise the sludge ORP to levels above +300 mv, it is expected that only modest rates of air delivery will be needed for the operation of the ORPA system. With the ORPA process, adequate aeration can be achieved by introducing air through spargers evenly spaced at the bottom of the reaction vessel and through the use of adequate mixing to achieve a uniform distribution of oxygen residuals throughout the sludge.

During the controlled-acidification period, the heavy metals are rapidly converted from their insoluble forms to their soluble species, having first been converted to forms conducive to solubilization by the preceding step of short-term controlled aeration which produces a prolonged elevation of ORP. Enhanced solubilization of metals effected by this process combination is based upon the principle that if sludges can be elevated in temperature and in ORP for a prolonged period prior to acid treatment, a shift in heavy metal speciation will occur toward metal precipitate forms that are more rapidly solubilized upon acidification. This can be accomplished in a process that promotes sustained aeration. Inorganic chemistry theory would predict that if sewage sludges could be equilibrated at ORPs above +300 mv, heavy metals and sulfur could be converted to their higher oxidation states resulting in a shift toward the formation of metal hydroxides, carbonates, and phosphates, thereby changing the nature and rate of heavy metal solubilization upon acidification. In addition, since the solubilization of most heavy metal precipitates may be characterized as endothermic, elevated temperatures of sludges obtained from heated anaerobic digesters will tend to shift solubilization equilibria in favor of the soluble species.

Figure 2:
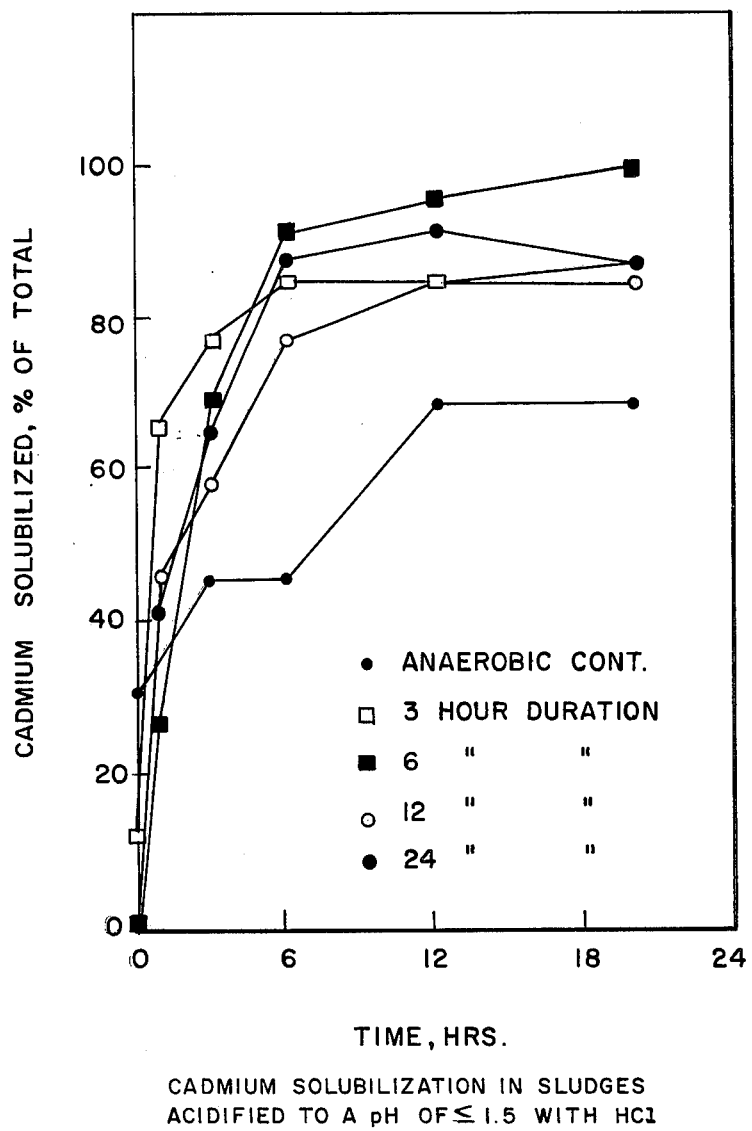
FIG. 2 is a graph depicting cadmium solubilization in anaerobically digested sludge acidified to a pH of $\leq 1.5$ with hydrochloric acid.

The following table illustrates the results of a laboratory experiment with a bench scale ORPA prototype in which aliquots of anaerobically digested sludge were aerated for 3, 6, 12, and 24 hours and then acidified with hydrochloric acid to a pH of less than 1.5 while maintaining aeration. The table indicates that 90 percent or more of the cadmium, zinc, nickel and lead were solubilized using just 6 hours of aeration followed by acidification to pH 1.5 for 12 hours. As much as 96 percent of the cadmium was solubilized under such treatment conditions in this experiment. The time-lapsed solubilization profile for cadmium, presented in FIG. 2, indicates that more than 90 percent of the cadmium was solubilized within 6 hours of aeration and 6 hours of acidification using the solubilization technique of the present invention (ORPA).

EFFICIENCIES OF HEAVY METALS SOLUBILIZATION AND ACID CONSUMPTION RATES FOR FIVE SLUDGES ACIDIFIED TO pH ≦ 1.5 FOR 12 HOURS

| Sludge type | Heavy Metals, Percent of initial solubilized | | | | | Acid consumption kg HCl*/ m³ sludge |
|---|---|---|---|---|---|---|
| | Cd | Zn | Ni | Pb | Cr | |
| Anaerobic control (no aeration) | 69 | 66 | 61 | 51 | 54 | 0.042 |
| Three hours aeration | 85 | 94 | 82 | 79 | 43 | 0.016 |
| Six hours aeration | 96 | 110 | 89 | 90 | 46 | 0.018 |
| Twelve hours aeration | 85 | 101 | 83 | 74 | 41 | 0.014 |
| Twenty-four hours aeration | 92 | 89 | 79 | 84 | 52 | 0.020 |

*Assume HCl at ~ 38% with density of 1.1885 gm/cc at 20° C.

Figure 3:
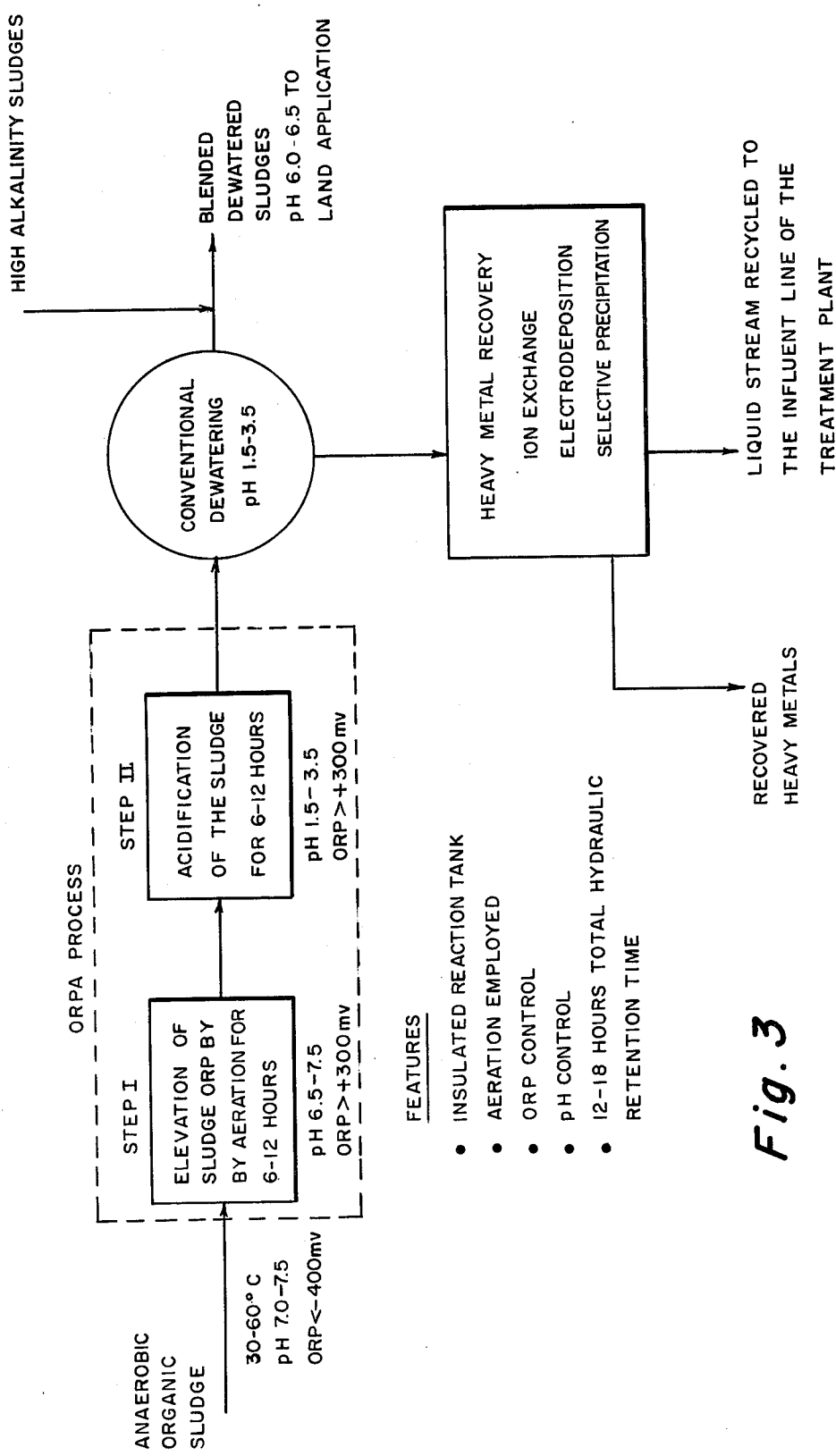
FIG. 3 is a conceptual flow chart of the present invention.

The results of the experiment strongly suggest that simple short-term aeration can replace aerobic biological treatment as an effective method of converting sludge heavy metals to species of higher oxidation states that are amenable to rapid acid solubilization. The principles of metals solubilization with the improved method of solubilization is the same as the inorganic chemistry principles that were operative with the combined biological-chemical detoxification. The steps are conceptually described in FIG. 3.

Although the same types of inorganic reactions are probably applicable for both inventions, the instant process has a number of apparent advantages over biological-chemical detoxification as a means of removing metals from organic sludges. These advantages include:

(1) reduced tank volume requirements;
(2) not dependent on a "living" biological process;
(3) capable of removing heavy metals from anaerobically stabilized sewage sludges; and
(4) aeration and energy requirements are reduced.

Figure 4:
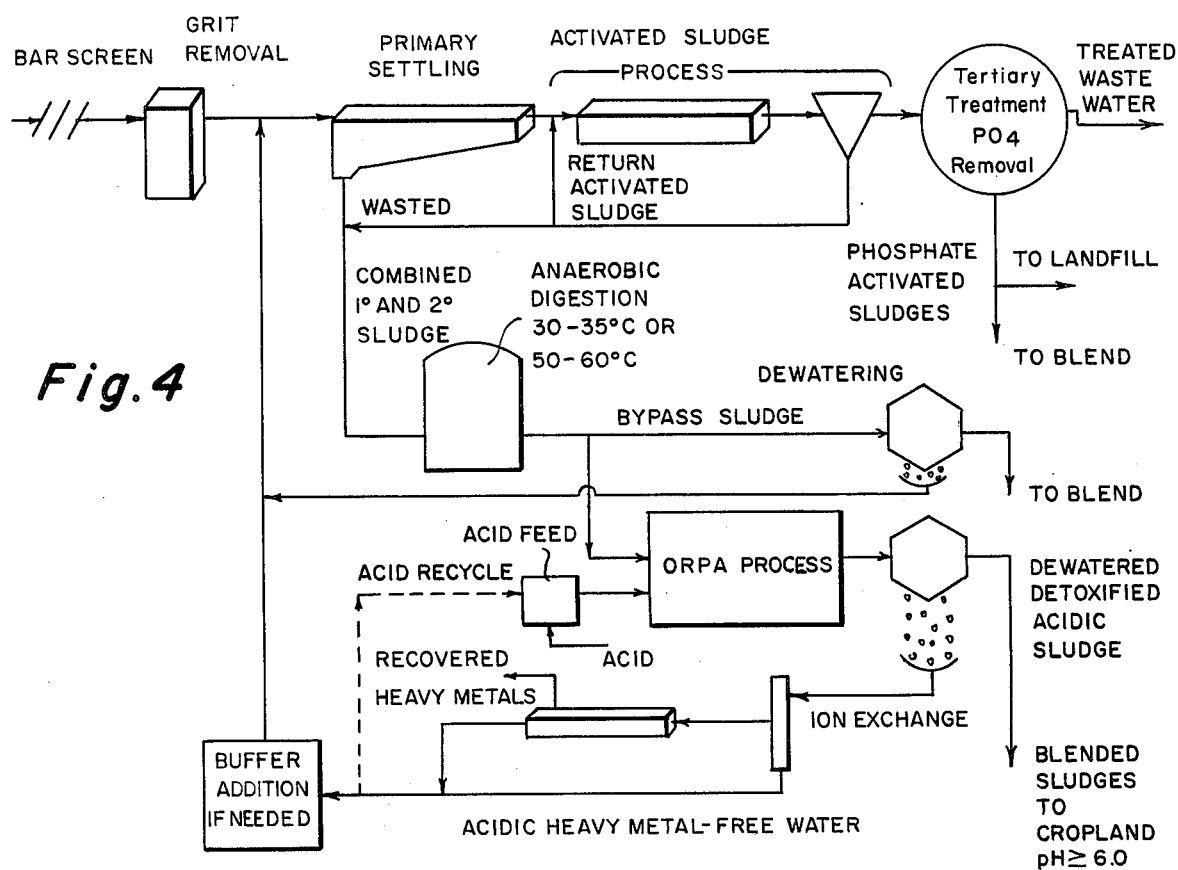
FIG. 4 is a flow chart illustrating one method of integrating the sewage sludge treatment process of the present invention into a conventional municipal sewage treatment system.

The most important advantage of the ORPA concept, however, is that this process may be integrated into most existing publicly owned treatment works with ease as an "add on" system to anaerobic digestion systems currently used for sludge stabilization. Once possible combination of sludge treatment systems is shown in FIG. 4. In this scheme, the degree of metals removal achieved may be regulated by the portion of the sludge stream chosen for metals extraction as depicted in FIG. 4. Ultimately, the various sludge fractions of the treatment scheme may be dewatered and recombined for subsequent land application. If a considerable portion of the sludge is bypassed around the ORPA heavy metals removal process and later combined with the sludge fraction which was acidified, the pH and alkalinity of the resultant mixture could very well be acceptable for direct land application without substantial additions of lime. If additional pH adjustment is needed, the phosphorus-lime sludges from the tertiary treatment stage may be added to amend acidic sludges.

Figure 5:
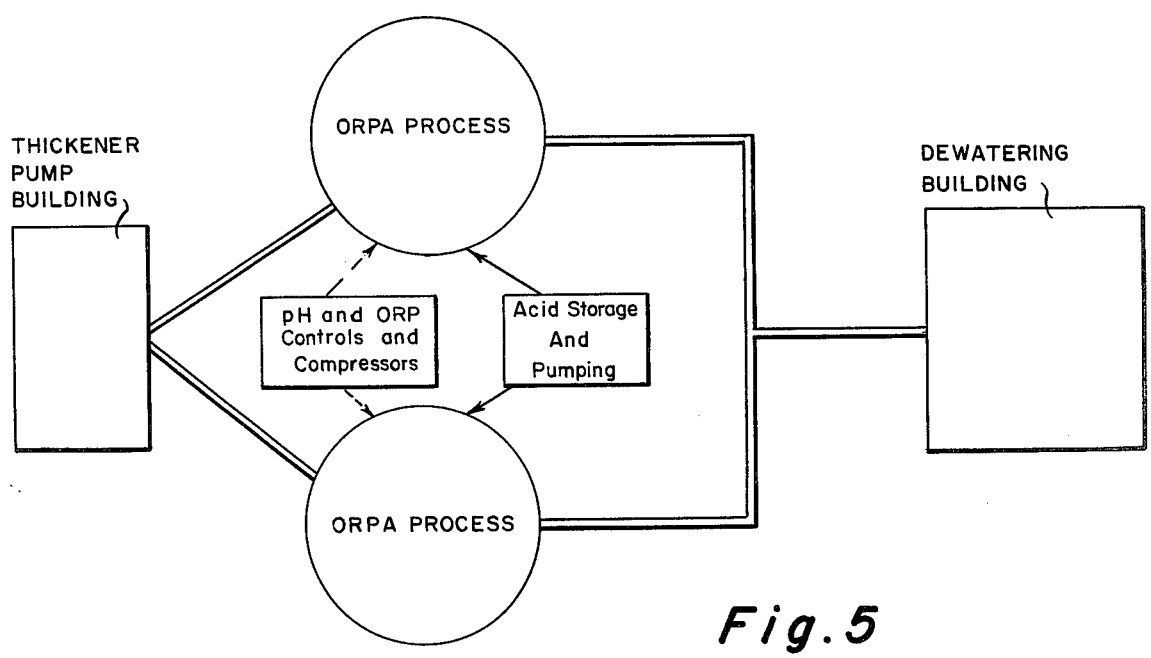
FIG. 5 is a schematic layout of a preferred embodiment of the present invention.

FIG. 5 illustrates schematically the preferred embodiment of the instant invention wherein two insulated reactor vessels with their accompanying control units are integrated into an existing anaerobic digestion system. The thickener building houses the pumps that transfer the sludge from the anaerobic digester to the reactor vessels of the ORPA process.

CONCLUSION

The instant invention presents a new concept of municipal sludge management in the light of local, state and federal standards pertaining to safe pathogen and cadmium loadings to farm land. Toxic metals are removed from sewage sludge at the sewage treatment facility by using ORP adjustment through controlled-environment acidification, followed by conventional dewatering.

Implementation of the ORPA process for the centralized recovery of sludge heavy metals at the sewage treatment plant has obvious advantages over any efforts to enforce more stringent controls on heavy metal discharges on an industry-by-industry basis. First of all, any small concentration of heavy metal occurring in the influent sewage stream is highly likely to show up in the treatment plant sludges at levels 10 to 1000 times greater. Although pretreatment requirements for industry could prevent the very high levels of sludge heavy metals that are toxic to biological systems, it would be very difficult if not logistically impossible to control all industrial discharges to sewers to the point that sludge cadmium levels, say, would be acceptable for land application on a nitrogen-requirement loading basis. If, for example, the desired level for cadmium in sludges (applied to cropland on a nitrogen basis) was set at 20 mg/dry kg, the permissible wet cadmium level in a 4 percent TS sludge would be around 2.4 ppm which could be predisposed by a sewage influent cadmium titer of only 0.024 ppm, assuming a 100×scrubbing and multiplication effect. For a city of over 100,000, less than 2.0 lbs of total cadmium discharged to sewers (by neglect or intent) during a 24-hour period could cause a 20 mg/dry kg limit for sludge cadmium to be exceeded. To prevent a few pounds of any commonly used metal from entering the sewers of each industrial city of the U.S. (with reasonable consistency and success) would, no doubt, be an insurmountable regulatory task. On the other hand, the detoxification of sewage sludges at a central location could allow confident monitoring and regulation of levels of sludge cadmium and other hazardous agents. Secondly, the social cost of requiring each individual industry to control cadmium to the sub-part-per-million or part-per-billion level would likely be far higher than the relative cost of centralized detoxification of sewage sludges. Thirdly, metals recovery from acid extraction streams could be conducted at a larger and, perhaps, a more economical scale with a centralized, municipal metals-recovery operation. The municipality operating a 10 MGD sewage treatment and sludge metals recovery facility, for example, could conceivably reclaim nearly half a pound of cadmium for every part per million of cadmium removed from wet sludge. In addition to use of the process by municipal sewage treatment facilities, the detoxification process may also be utilized by industry to remove heavy metals from concentrated organic sludges.

While in accordance with the provisions of the Patent Statutes the preferred forms and embodiments of the invention have been illustrated and described, it will be apparent to those skilled in the art that various changes and modifications may be made without deviating from the inventive concepts set forth.

What is claimed is:

1. A method for the chemical detoxification of anaerobically digested organic sludge, which sludge contains toxic heavy metals in insoluble form, comprising the sequential steps of:
   (a) introducing a quantity of anaerobically digested sludge into an insulated acid-resistant reaction vessel, said sludge having a temperature of from about 30° C. to 60° C.;
   (b) mixing and aerating said sludge at a rate sufficient to increase the oxidation reduction potential to above +300 mv.;
   (c) maintaining said increased oxidation reduction potential for a period of 6-12 hours, thereby to convert the heavy metals within the sludge to a desired oxidation state;
   (d) adding to said sludge a quantity of concentrated acid in an amount sufficient to acidify said sludge to a pH of from about 1.0 to about 3.0 for an acidification period of 6 to 12 hours while maintaining said oxidization reduction potential at a level greater than +300 mv., thereby to convert the oxidized heavy metals to their soluble species; and
   (e) dewatering the acidified sludge to remove the solubilized heavy metals therefrom, thereby to produce dewatered, detoxified acidic sludge and acidic, heavy-metal-containing water.

2. The method as recited in claim 1, and further including the step of maintaining said increased oxidation potential by continued aeration of said sludge, said aeration being regulated by an oxidization reduction potential control system including a source of oxygen, and said increased oxidation potential also being maintained by continued mixing of said sludge, thereby achieving uniform distribution of oxygen residuals throughout said sludge.

3. The method as recited in claim 2, wherein said source of oxygen comprises compressed air, and further wherein said compressed air is introduced into said reactor vessel through spargers evenly spaced at the bottom of said reactor vessel.

4. The method as recited in claim 1, and further including the step of controlling the addition of said concentrated acid as a function of the pH value of the mixed sludge.

5. The method as recited in claim 4, wherein said concentrated acid is selected from the group consisting of sulfuric acid and hydrochloric acid, and further wherein the preferred pH value range of said acidified sludge is from 1.5 to 2.5.

6. The method as recited in claim 1, and further including the step of recovering said heavy metals from said acidic, heavy-metal-containing water.

7. The method as recited in claim 1, and further including the step of integrating said method into conventional anaerobic municipal sewage treatment systems, wherein a first portion of the sludge stream flowing through said system is directed into said reactor vessel and a second portion of the sludge stream is permitted to bypass said reactor vessel, said second portion being dewatered to produce dewatered more-alkaline sludge.

8. The method as recited in claim 4, and further including the step of blending said dewatered more-alkaline sludge with said dewatered detoxified acidic sludge, the pH of the resulting mixture being acceptable for direct land application.

9. The method as recited in claims 1 or 8, and further including the step of blending said dewatered detoxified acidic sludge with phosphorous-lime sludges from the tertiary treatment stage of the conventional anaerobic municipal treatment system, the pH of the resulting mixture being acceptable for direct land application.

* * * * *